(12) United States Patent
Yagnik

(10) Patent No.: US 8,085,995 B2
(45) Date of Patent: Dec. 27, 2011

(54) IDENTIFYING IMAGES USING FACE RECOGNITION

(75) Inventor: Jay Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 1039 days.

(21) Appl. No.: 11/566,075

(22) Filed: Dec. 1, 2006

(65) Prior Publication Data

US 2008/0130960 A1   Jun. 5, 2008

(51) Int. Cl.
*G06K 9/62* (2006.01)
(52) U.S. Cl. ........ 382/118; 382/115; 382/116; 382/181; 382/313; 707/E17.026; 707/E17.108
(58) Field of Classification Search .................. 382/118, 382/181, 115, 116, 313; 707/E17.026, E17.108
See application file for complete search history.

(56) References Cited

U.S. PATENT DOCUMENTS

| 5,012,522 | A | 4/1991 | Lambert |
| 6,038,333 | A | 3/2000 | Wang |
| 6,853,739 | B2 | 2/2005 | Kyle |
| 2004/0099731 | A1 | 5/2004 | Olenick et al. |
| 2004/0264780 | A1 | 12/2004 | Zhang et al. |
| 2008/0097981 | A1* | 4/2008 | Williams et al. .................. 707/5 |

FOREIGN PATENT DOCUMENTS

| WO | WO 99/45483 | 9/1999 |
| WO | WO 02/19137 | 3/2002 |

OTHER PUBLICATIONS

Written Opinion of the International Searching Authority, dated Mar. 14, 2008.
International Search Report, dated Mar. 14, 2008.
Berg, T.L., et al., "Names and Faces in the News", Computer Vision and Pattern Recognition, 2004, Proceedings of the 2004 IEEE Computer Society conference In Washington, DC, Jun. 27-Jul. 2, 2004, vol. 2, pp. 848-854.
Chen, Longbin et al., "Face Annotation for Family Photo Management", International Journal of Image and Graphics, World Scientific Publishing Co., Singapore, vol. 3, No. 1, Dec. 30, 2002, pp. 1-14.
Nazli, Ikizler et al., "Person Search Made Easy", Image and Video Retrieval; Springer-Verlag, Berlin, vol. 3568, Aug. 4, 2005, pp. 578-588.
Supplementary European Search Report mailed Jan. 19, 2010 in European Application No. 07854838.
Chinese Office Action for application No. 200780050762.0, mailed Feb. 24, 2011, 9 pages.

(Continued)

*Primary Examiner* — Samir Ahmed
*Assistant Examiner* — Ruiping Li
(74) *Attorney, Agent, or Firm* — Fish & Richardson P.C.

(57) ABSTRACT

A method includes identifying a named entity, retrieving images associated with the named entity, and using a face detection algorithm to perform face detection on the retrieved images to detect faces in the retrieved images. At least one representative face image from the retrieved images is identified, and the representative face image is used to identify one or more additional images representing the at least one named entity.

33 Claims, 5 Drawing Sheets

OTHER PUBLICATIONS

EPO Communication for application No. 07 854 838.5, mailed Dec. 22, 2010, 5 pages.

Authorized officer Yoshiko Kuwahara, International Preliminary Report on Patentability for application No. PCT/US2007/085950, mailed Jun. 11, 2009, 6 pages.

EPO Communication for application No. 07 854 838.5, mailed Feb. 1, 2010, 4 pages.

Supplementary European Search Report for application No. 07 854 838.5, mailed Jan. 19, 2010, 5 pages.

* cited by examiner

IDENTIFYING IMAGES USING FACE RECOGNITION

FIELD

The following disclosure relates to linage recognition.

BACKGROUND

The names of persons, such as famous persons, are popular queries in searching large collections of content such as the World Wide Web ("web"). In conventional search systems search results responsive to a query for a person can include images of the person identified in the query. For search results to identify and return appropriate content responsive to a query, the content must be associated with the search query. For instance, to identify images associated with a search query that includes a person's name requires that the images be keyed to the person, such as via metadata, tags, or the like to include the person's name. Unfortunately, images in large collections such as available through the web, including pictures and screens shots from video content, typically are not keyed and may not include information associated with a pictured person's name. Accordingly, conventional search systems may not be able to identifying these un-keyed images responsive to a search query that includes an individual's name.

SUMMARY

According to one aspect, there is disclosed a method. The method includes identifying at least one named entity, retrieving images associated with the at least one named entity, and performing face detection on the retrieved images to detect faces in the retrieved images, where the face detection is performed using a face detection algorithm. The method can further include identifying at least one representative face image from the retrieved images, and using the at least one representative face image to identify one or more additional images representing the at least one named entity.

One or more of the following features may also be included. The method can include receiving a search query from a user including the at least one named entity, and can include generating search results based on the search query, where the search results include the one or more additional images. The at least one named entity can be the name of a person. Identifying the at least one named entity can include identifying the at least one named entity from a query log or a web document. Furthermore, retrieving images associated with the at least one named entity can include executing an image search to identify a plurality of images associated with the at least one named entity.

The method can also include performing face matching for the detected faces in the retrieved images including comparing each detected face to each other detected face to identify faces that match a particular face image associated with the at least one named entity. The number of faces that match the particular face image can also be determined. Moreover, the method can include comparing the determined number of faces that match the particular face image to a threshold value, and/or determining the detected face in the retrieved images that matches the highest number of other detected faces in the retrieved images.

A training set of face images can he generated where the training set includes each of the detected faces that match the particular face image associated with the at least one named entity. One or more face models maybe generated from the training set of face images, and may be labeled with at least a portion of the name of the at least one named entity. The at least one face model can be used to identify the one or more additional images, which can include comparing the face model to a collection of images to identify the one or more additional images. Additionally, the method can include associating the one or more additional images with the at least one named entity.

These general and specific aspects may be implemented using a system, a method, or a computer program, or any combination of systems, methods, and computer programs.

BRIEF DESCRIPTION OF THE DRAWINGS

Reference will now be made to the accompanying drawings, which are not necessarily drawn to scale, and wherein.

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein. Like numbers refer to like elements throughout.

The following disclosure describes systems, methods, and computer program products that can identity images associated with an individual or other identifiable image element, and label the identified images with the name of the individual (or element) represented in the image. By way of example, implementations are described that provide for searching for images associated with a person's name, and using the results of the search to build a face model that can be used to identify additional images associated with the same person. This permits the identification of images that were not previously associated with metadata, tags, or other information identifying the person in the image. The labeling of images provides the ability to provide comprehensive search results to a user query, such as a user query including a famous person's name. Implementations described herein can be automated and may also be used to maintain up-to-date databases and/or records of images. As referenced herein, images include still pictures, such as .jpegs, .gifs., .bmps, or the like, and screen shots or still images taken from videos. Additionally, although this disclosure focuses on searches related to web sites, implementations are also applicable to searching any machine-readable or machine-storable document.

Figure 1:
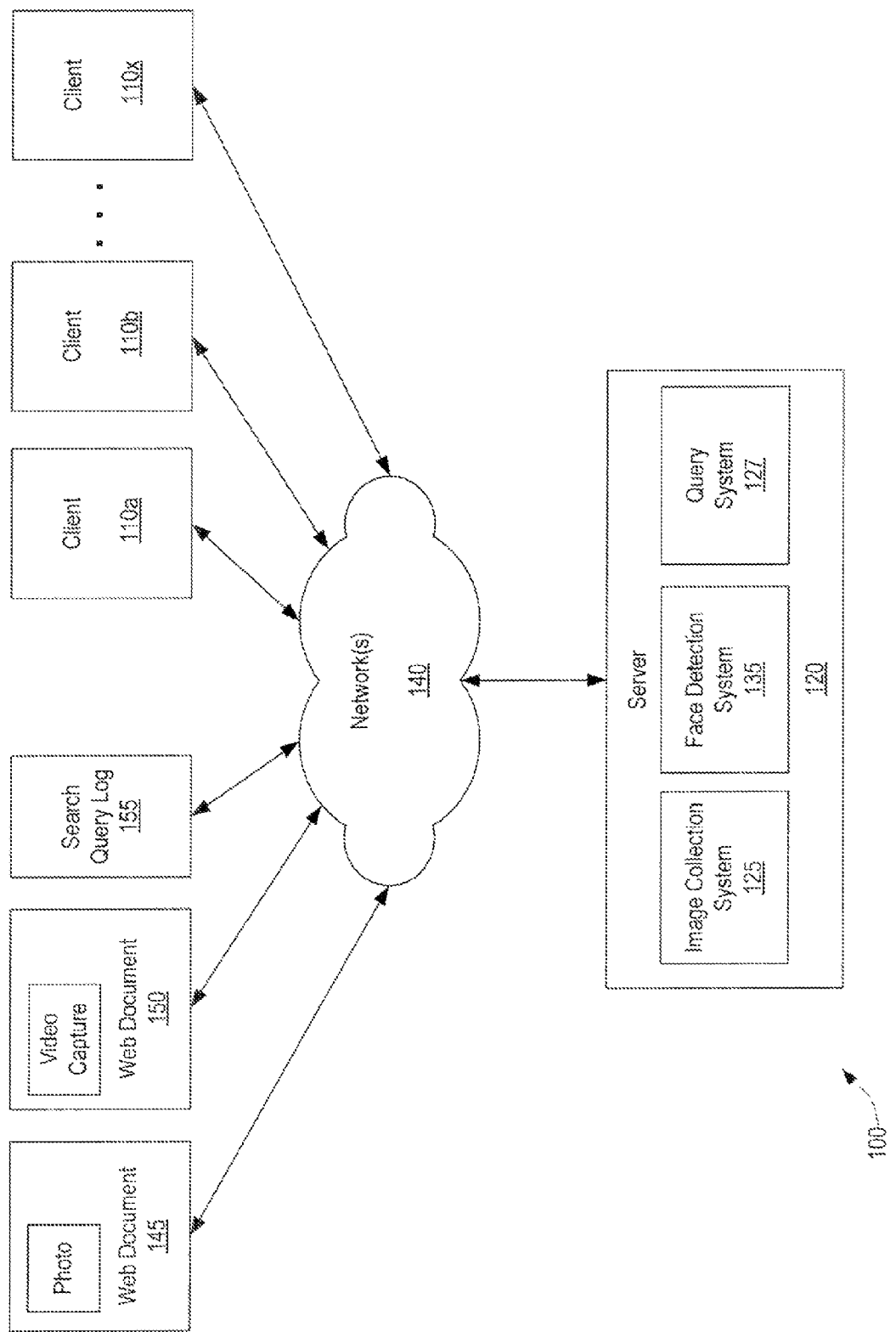
FIG. 1 shows an exemplary image identification system, according to an illustrative implementation.

Referring to FIG. 1, an exemplary image identification system 100 is shown according to an illustrative implementation. The system 100 includes clients 110a, 110b, 110c, . . . 110x in communication with a server 120 via one or more networks 140. The clients 110a, 110b, 110c, . . . 110x can include a device, such as a personal computer, a wireless telephone, a personal digital assistant (PDA), a lap top computer, or another type of computation, communication or electronic device, a thread or process running on one of these devices, and/or an object executable by one of these devices. Although multiple clients 110a, 110b, 110c, . . . 110x and a single server 120 are illustrated in FIG. 1, there can be more servers and more or fewer clients. For instance, some of the functions performed by the server 120 can be performed by one or more other servers such that the server 120 can represent several devices, such as a network of computer processors and/or servers. Additionally, in some implementations a client can perform a function of the server 120 and the server 120 can perform a function of a client.

The image identification system 100 also includes one or more web documents 145, 150 and a search query log 155, which can be in communication with the server 120 via one or more networks 140. The web documents 145, 150 and/or search query log 155 may reside on one or more servers or computers (not illustrated). According to an implementation, one or more of the web documents 145, 150 and/or search query log 155 may reside on one or more of the clients 110a, 110b, 110c, 100x. The web documents 145, 150 and search query log 155 can include the names of persons that may be the subject of a user's search query. The web documents can also include images that may include pictures of persons that are the subject of a search query. The images may or may not be associated with text, metadata, tags, or other information identifying the content of the images, for instance, the identity (i.e., name) of the person or persons in a picture.

The server 120 can include one or more servers that gather, process, maintain, manage information and/or provide search results to users. In an exemplary implementation, the server 120 can include an image collection system 125 that retrieves images associated with named entities, such as people, that may be viewed with the clients' 110a, 110b, 110c, . . . 110x access of web documents. The server 120 can also include a face detection system 135. The face detection system 135 can run face detection algorithms and perform additional processes to identify images and associate them with a named entity. The server 120 can also include a query system 127 that receives a search query from a user, such as a search query that includes the named entity, and provides search results to the user. According to an implementation, the search results include images representing the named entity that is the subject of the search query, even if the images are not originally associated with text, metadata, tags, or other information that identifies the images as appropriate results responsive to the search query submitted by a user, The network(s) 140 can include one or more local area networks (LANs), wide area networks (WANs), telephone networks, such as the Public Switched Telephone Network (PSTN), intranets, the Internet, and/or or other type of network. The clients 110a, 110b, 110c, . . . 110x, server 120, web documents 145, 150, and/or search query log 155 can connect to the network(s) 140 via wired, wireless, or optical or other connections. In alternative implementations, one or more of the devices illustrated in FIG. 1 are directly connected to another one of the devices. For example, in one implementation, the search query log 155 or one or more clients 110a, 110b, 110c, . . . 110x can be directly connected to the server 120.

Figure 2:
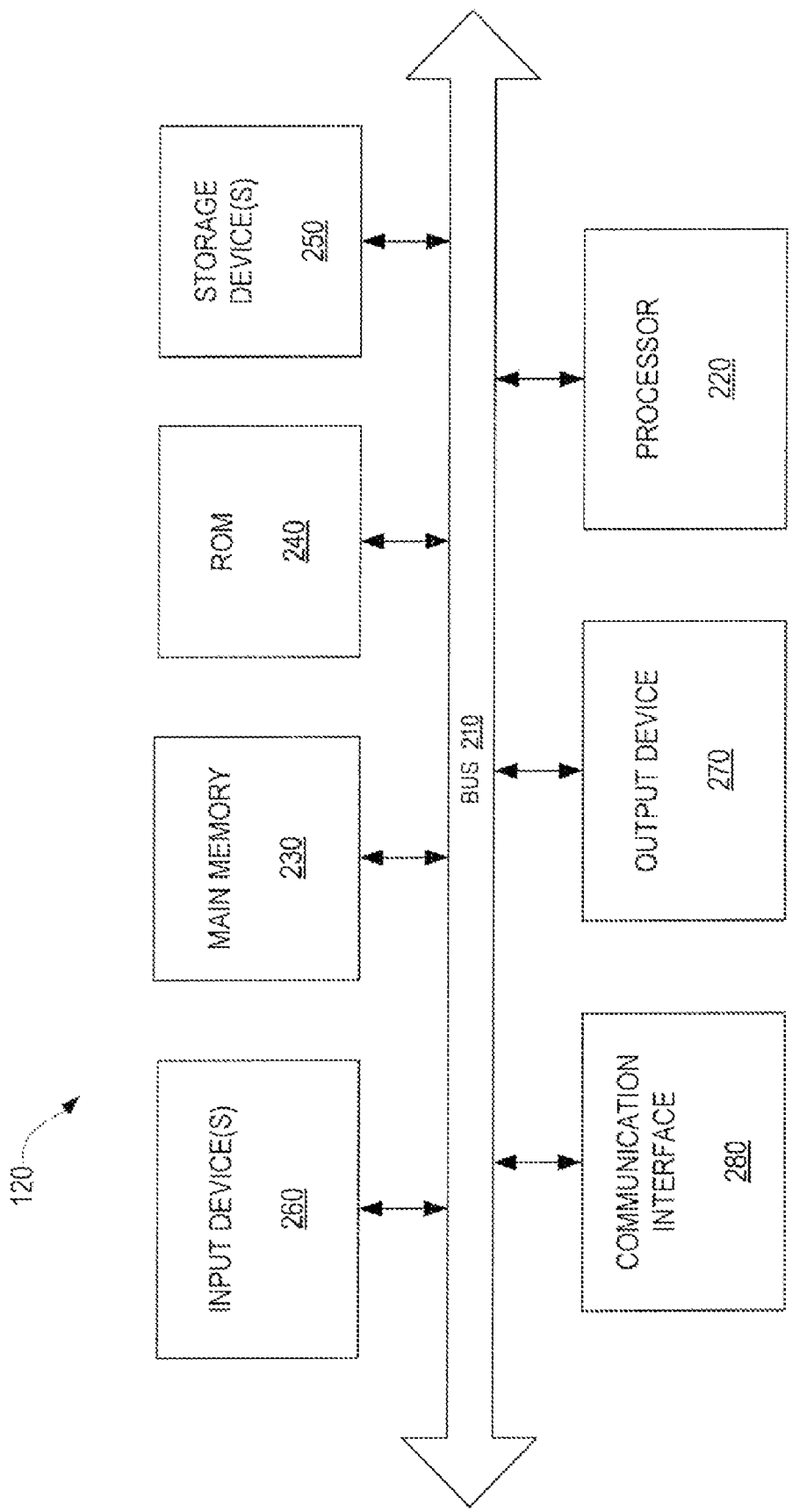
FIG. 2 shows a server in the image identification system of FIG. 1, according to an illustrative implementation.

FIG. 2 shows the server 120 of FIG. 1, according to an illustrative implementation. The server 120 can include a bus 210, a processor 220, a main memory 230, a read only memory (ROM) 240, a storage device 250, one or more input devices 240, one or more output devices 270, and a communication interface 280. The server components may implement, in whole or part, the image collection system 125, face detection system 135, and/or query system 127.

The bus 210 can include one or more paths that permit communication among the components of server 120. The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

The server 120 can also include an input device 260 having one or more conventional mechanisms that permit a user to input information to the server 120, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the server 120 to communicate with other devices and/or systems. For example, the communication interlace 280 can include mechanisms for communicating with another device or system via one or more networks, such as the network(s) 140.

In operation the server 120 can store data associated with individual web documents, including images and face models, and can perform searches based on inputs from clients 110a, 110b, 110c, . . . 110x. The server 120 can also search for images associated with a person's name, and using the results of the search, can build a face model that can be used to identify additional images associated with the same person. This facilitates the server's automated identification of images not previously associated with metadata, tags, or other content identifying the person in an image, and permits the server 120 to provide comprehensive search results to a user query. The server 120 can also automatically maintain up-to-date databases and/or records of images identified as associated with individuals using face model comparisons.

In one implementation, the server 120 performs these operations in response to the processor 220 executing software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this disclosure. Alternatively, hardwired circuitry can be used in place of or in combination with software instructions to implement processes consistent with the disclosure. Thus, implementations are not limited to any specific combination of hardware circuitry and software.

Figure 3:
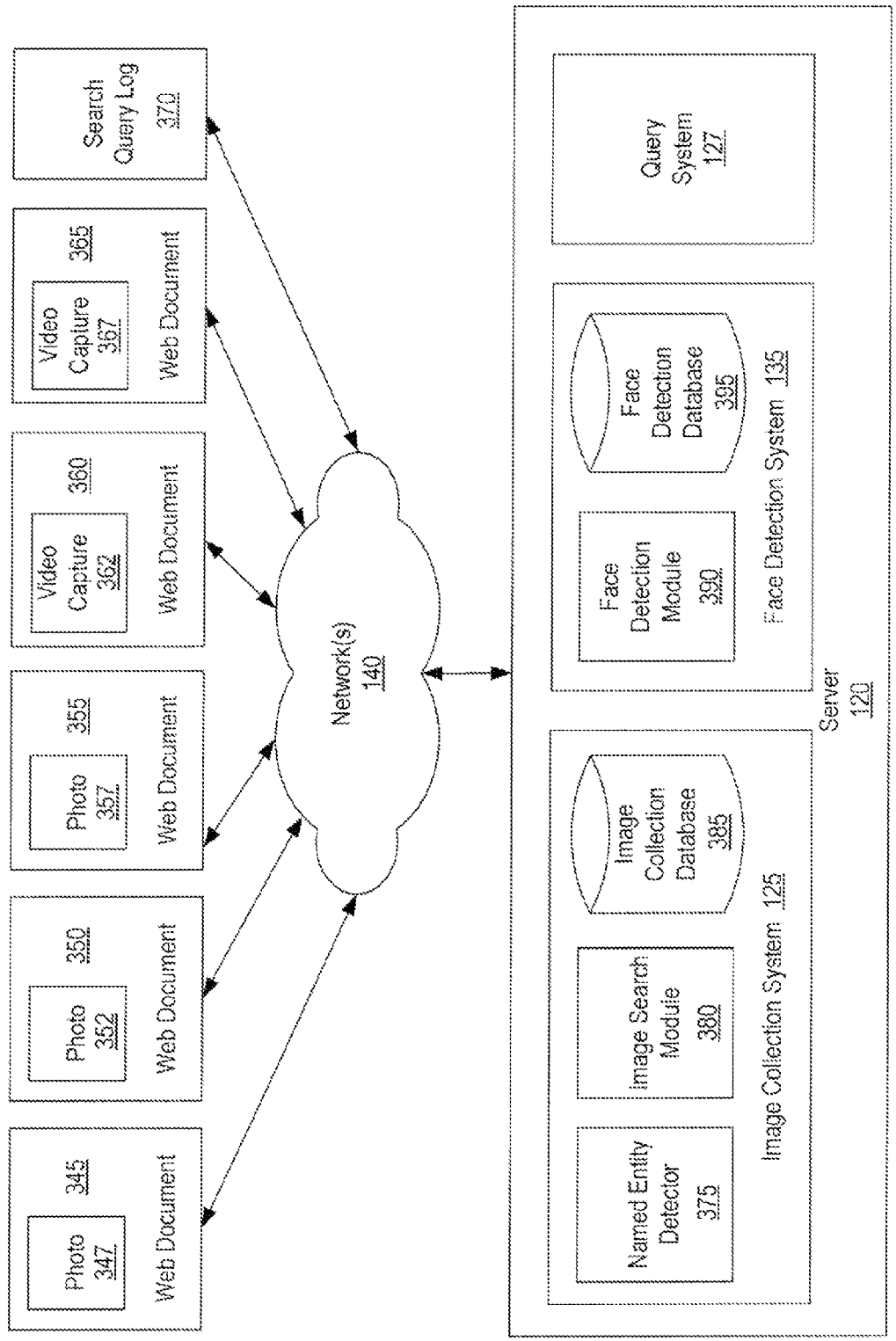
FIG. 3 is a functional block diagram illustrating elements of the image identification system of FIG. 1, according to an illustrative implementation.

FIG. 3 is block diagram of elements of the image identification system 100 shown in FIG. 1, according to an exemplary illustrative implementation. The server 120 can include an image collection system 125, a face detection system 135, and a query system 127. The logical blocks illustrated in FIG. 3 can be implemented in software, hardware, or a combination of hardware and software. In addition, each of the functional blocks can represent one or more computer processors, threads, and/or objects. It should also be understood that in alternative implementations, the functions performed by one of the blocks in FIG. 3 can be performed by another block. In yet other implementations, a single logical block/processing device can perform all of the functions of the image collection system 125, face detection system 135, and query system 127.

The server 120 includes a query system 127, which can be used by one or more users to submit query requests to the server 120, such as search requests for a named entity. For instance, the query system 127 may receive a user request for images of a person named 'John Doe'. Queries received by the query system 127 are stored in a search query log 370. Although illustrated in FIG. 3 as external to the server 120, according to an implementation, the search query log 370 may be located within the server 120.

The image collection system 125, and more particularly, the named entity detector 375, is operable to identify named entities, such as the names of individuals, that may be identified in one or more web documents 345, 350, 355, 360, 365 (e.g., web pages) and/or in the search query log 370. For instance, in an illustrative example, the named entity detector 375 can identify that the name 'John Doe' is included in text, metadata, or other content of three web documents 345, 350, 355 and the search query log 370. Once identified, named entities can be stored within the named entity detector 375, within an image database 385, or one or more other databases internal or external to the image collection system 125 or server 120. According to one implementation, the named entity detector 375 is operable to identify only named entities that meet one or more threshold values, such as a minimum number of occurrences of a named entity in web documents, or the ranking of the named entity in a search query log (e.g., based on the percentage of queries or total number of queries including the named entity), which can serve to limit the number named entities identified by the image collection system 125 to only, for example, popular named entities.

The image search module 380 within the image collection system 125 is operable to collect images associated with the named entities identified by the named entity detector 375. Images may be collected from one or more web documents 345, 350, 355 that contain photos 347, 352, 357, from one or more web documents that include video capture screen shots 360, 365, from data repositories of images and/or video content, and any other location that stores images that is accessible by the image collection system 125 via the network(s) 140. The image search module 380 performs the image collection including retrieving images that include metadata, tags, or other content that affirmatively identifies that an image is associated with a named entity. For instance, the image search module 380 is operable to identify and retrieve a photo 347 of 'John Doe' on web document 345, and a photo 352 of 'John Doe' on web document 350 where the respective photos 347, 352 each include metadata identifying 'John Doe'. The image search module 380 can retrieve images for each named entity identified by the named entity detector 375. Images collected by the image collection system 125 can be stored within an image database 385 and/or one or more other databases internal or external to the image collection system 125 or server 120. According to another implementation, the image search module 380 can store the location of images in an image database instead of retrieving entire images, which may reduce the amount of storage necessary to retain data.

The face detection system 135, and more particularly, the face detection module 390, is operable to perform detection (e.g. face detection) on the images retrieved (or identified) by the image collection system 125. Face detection is performed on the retrieved images to identify faces in the retrieved images, and may be executed by one or more conventional face detection algorithms of the face detection module 390. The faces detected by the face detection module 390 can be stored in the face detection database 395, or in one or more other databases internal or external to the face detection system 135 or server 120. For instance, the faces (i.e., face images) of 'John Doe' in the respective photos 347, 352 retrieved from the web documents 345, 352 may be identified and stored in the face detection database 395.

The face detection module 390 is further operable to compare detected image elements (e.g. faces) to each other to identify other elements (e.g. faces) that match. This process permits the identification of images consistent with a particular entity, for instance, a famous person. The comparison of detected faces to each other is advantageous in excluding images that are associated with a named entity (as identified by the image search module 380) but fail to include a face image of the named entity, or cannot be confirmed to include the face of the named entity. In one implementation, to effect this, all of the faces for a named entity are compared to each other.

According to an implementation, the number of faces that match each particular face is determined by the face detection module 390, which can be stored by the face detection module 390 as a vote count for each particular detected face. The particular face having the highest vote count may be labeled as a representative face for the named entity, e.g., person, the particular face is associated with. For instance, if 10 faces are detected in 15 'John Doe' images retrieved from one or more web documents, one face of the 10 faces will be labeled as a representative face because it matches a greater number of the other 9. As an illustrative example, the first face of 'John Doe' in a set often faces may match the third, fifth, and seventh faces, while the remaining faces are determined to match no more than one other face. In such an example, the first face can be labeled the representative face for 'John Doe.' Face to face matching may be executed by appearance-based face recognition methods, such as Principal Component Analysis (PCA), Independent Component Analysis (ICA), Linear Discriminant Analysis (LDA), or foe like. Local feature-based face matching algorithms can also or alternatively be used, such as Elastic Bunch Graph Matching, or the like. According to one implementation, similarity thresholds associated with the matching process can be varied to dictate how similar faces must be before a match is identified.

In one implementation, the face detection module 390 generates a training set of faces for each named entity with all of the faces that match the representative face. In the preceding illustrative example in which a first face of 'John Doe' in a set often is identified as the representative face, the three other matching faces (i.e., the third, fifth, and seventh, faces) are added to the training set along with the representative face. After initial generation of the training set from one or more images, the training set may be augmented by the face detection module 390. For instance, the training set can be augmented alter additional faces are detected. According to another implementation, the training set can be generated from a larger set of face images, such as from any detected face images associated with a named entity.

The training set is used by the face detection module 390 to build a face model for the named entity. Continuing with the illustrative example described above, one 'John Doe' face detected by the face detection module 390 may be labeled as a representative face, and all faces matching the representative face can be used to build a face model labeled with the named entity 'John Doe'. According to an implementation, the face model, is a composite model built from the sum of the faces from the training set. The face model can be built using conventional cluster analysis techniques, in which cluster coefficients are used to generate a composite face image from the training set. For instance, point to cluster distance and classification methods may be used, including methods using distance criterion, such as min/median/max to all points in the cluster, or by using composite votes by taking the top 'k' nearest neighbors and taking the majority cluster in the 'k' as the classified person. According to another implementation, instance, a complex model may be built using Oriented PCA (OPCA) or Kernel OPCA to capture the variance in a class and by computing a new feature projection based on the variance.

According to another implementation, instead of identifying a representative face and establishing a training set using those faces that match the representative face, clustering algorithms can be used to identify representative clusters in detected faces, where the representative clusters are those that have a sufficient density over a threshold value. Representative images can be taken from each cluster having a sufficient density such that a single representative face need not be selected to generate a training set. This can be advantageous in permitting the capturing of images despite a diverse range of images found in a large collection of images, such as on the web, where pictures include a variety of poses, lighting differences, subject ages, and the like. This permits grouping of representative images from many samples (i.e., from clusters) that would otherwise not be grouped using the matching of faces using the face matching methods described above.

According to another implementation, face matching may be performed by the face detection module 390 using a set of selected, labeled faces as an initial training set for training a face matching algorithm to identify images associated with a particular person. Thereafter, faces identified in a collection of images, such as on the web, can be mined and compared using clustering techniques to identify a set of images that are potential matches for that, particular person even though the images may be in different clusters. The face matching algorithm is then updated with new data, which provides it with greater invariance to diversity in images, such as pictures including a variety of poses, lighting differences, subject ages, and the like. The face matching algorithm can then mine additional images, repeating the process until a set of images are collected for each particular individual, where the iterative approach can increase the probability that the face detection module will identity matching faces for a person.

Using the image collection system 125 and the face detection system 135, the server 120 can automatically identify images in web documents, and update face models with detected faces in those images. The use of face models to automatically identify images permits the collection and maintenance of images associated with named entities, such as famous persons, without the need for human interaction, and without requiring that each identified image be associated with metadata, tags, or other content associating an image with the named entity.

As an illustrative example, the image search module 380 may identify that there is a photo 347 of 'John Doe' on web document 345, and another photo 352 of 'John Doe' on web document 350 where the respective photos 347, 352 each include metadata identifying 'John Doe'. A third photo 357 on web document 355 may not be labeled or associated with any individual via text, metadata or the like such that conventional search algorithms are unable to identify the photo 357 as associated with 'John Doe'. Using a face model built for 'John Doe' using for example the above-described techniques, the face detection system 135 can identify the third photo 357 as matching the model face. As a result of the match, the face detection module can label the third image with the named entity (i.e., 'John Doe', where the image and its label can be stored within the face detection database 395. Thereafter, user queries requesting search results for the query 'John Doe' will include all three photos 347, 352, 357 in the search result.

According to an implementation, the image collection system 125, face detection system 135, and query system 127 may be distributed among two or more servers 120. According to yet another implementation, some or all of the functions of the image collection system 215, face detection system 135, and/or query system 127 can be performed by program code comprising program instructions that are executable by the server 120, or by one or more additional computer processing systems. Additionally, according to an implementation, the image collection database 385 and/or face detection database 395 can be external to the sewer 120 and can include one or several databases for storing image-related data.

According to an implementation, face models may be automatically and routinely built by the server 120 for popular named entities identified in search queries identified in the search query log 370. For instance, face models may be updated routinely after a period of time, such as 30 days, so that up-to-date databases of images are maintained for retrieval in providing responses to popular queries. During updates to existing models, face models are further refined, if necessary, by the inclusion of additional images in the training set used to create each face model. This serves to maintain an accurate, up-to-date model to effectively identify new images that might be added to the web or other data collection.

Figure 4:
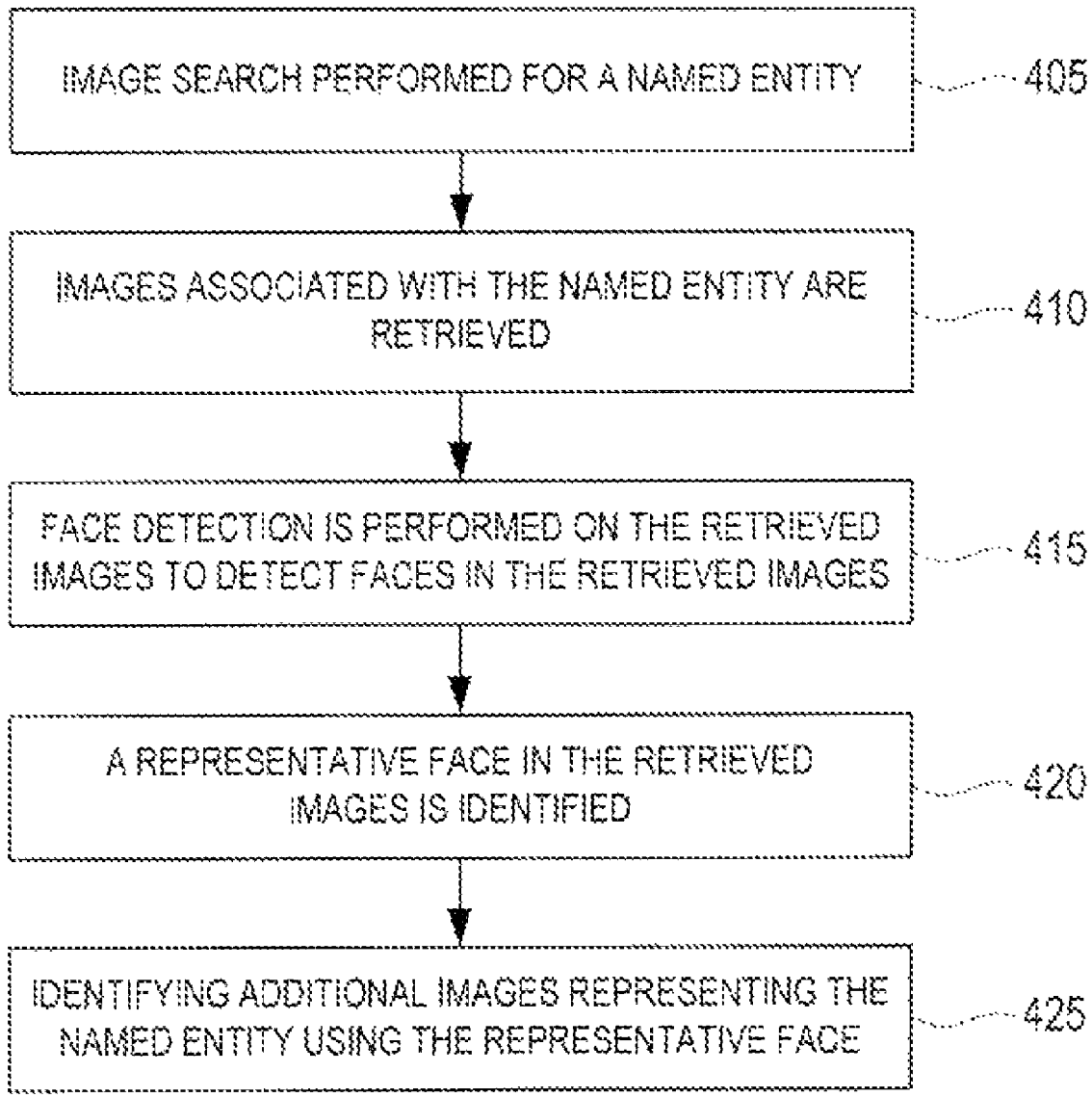
FIG. 4 is a block diagram flowchart showing a method implemented by an exemplary image identification system, according to an illustrative implementation

FIG. 4 shows an exemplary method implemented by the system of FIG. 1, according to an illustrative implementation. An image search is performed for a named entity, such as the name of a famous person (block 405). Images associated with the named entity are retrieved (block 410), and face detection is performed on the retrieved images to detect faces in the retrieved images (block 415). After face detection is completed, a representative face is identified from the retrieved images (block 420). The representative face is then used to identify additional images representing the named entity (block 425). According to one implementation, the additional images representing the named entity are identified even though they do not include metadata, tags, or other information associating the images with the named entity prior to their identification.

Figure 5:
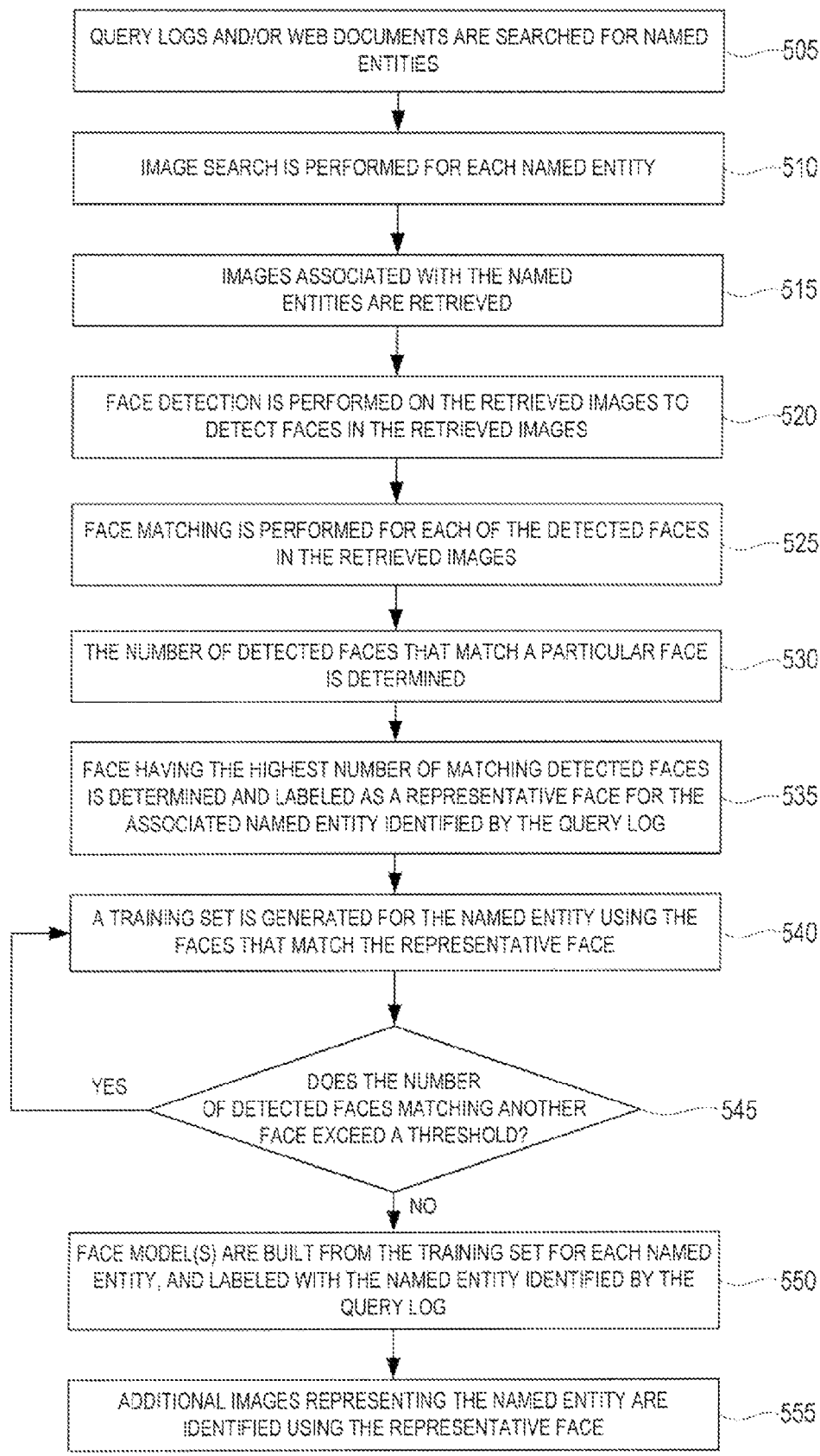
FIG. 5 is a block diagram flowchart showing a method implemented by an exemplary image identification system, according to an illustrative implementation

FIG. 5 shows another exemplary method implemented by the system of FIG. 1, according to another illustrative implementation. Named entities are identified from search query logs and/or web documents (e.g., from web pages) (block 505). According to an implementation, this identification is performed automatically by the server 120 to continuously update a list of popular named entities, such as persons, whose identity appears in web documents and/or search queries. An image search is performed for each named entity (block 510). According to an implementation, the image search can he performed by the image search module 380 residing within an image collection system 125 of the server 120. Additionally, according to an implementation, an image search may be performed only for popular named entities that meet a particular threshold, such as the number of occurrences of a named entity, such that images for only popular named entities are searched. Images associated with each named entity are then retrieved (block 515).

Subsequent to the retrieval of images associated with each named entity, face detection is performed on the retrieved images to detect faces, if any, in each retrieved image (block 520). According to an implementation, this may be performed by a face detection algorithm, such as a face detection algorithm within the face detection system 135. Using the detected faces, face matching is then performed for each of the detected faces to identify similar faces for each named entity (block 525). For each named entity the number of detected faces that match a particular face is determined (block 530). According to an implementation, a count is maintained for each face, where the count identifies the number of matching faces for that face. The face having the highest count, i.e., the highest number of matching detected faces, is determined and labeled as a representative face for the associated named entity (block 535). The count may be generated by the face detection module 390, according to an implementation. The faces that match the representative face are used to generate, or augment, a training set of faces for the named entity (block 540). If the number of detected faces matching another face exceed a threshold, such as a count of 6 or 7, then that face may be used as a representative face for a named entity, and a training set may be generated for faces that match the representative face (blocks 545, 535, 540).

Face models are built from each training set for each named entity, and are labeled with the named entity (block 550). According to an implementation, face models are built by the face detection module 390. After models are created for each named entity, they are compared against collected images, and matches are labeled with the named entity. The collected images can include images collected from web documents, videos, databases, or other sources, and can include images that have no metadata, tags, or other information identifying them as associated with a particular named entity (block 555).

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or structural means, may also be utilized to implement corresponding software structures and algorithms, and equivalents thereof.

It will be apparent to one of ordinary skill in the art that aspects of the invention, as described above, can be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

That which is claimed:

1. A method, comprising:
   identifying at least one named entity;
   retrieving a set of three or more images associated with the at least one named entity, each of the images in the set including an associated textual description that includes at least a portion of a name of the named entity;
   performing face detection on the retrieved images to detect faces in the retrieved images, wherein the face detection is performed using a face detection algorithm;
   identifying at least one representative face image from the retrieved images including comparing each detected face to other detected faces, where identifying the representative face image includes identifying the representative face image as the image that contains the detected face that matches a greatest number of the other of the detected faces; and
   using the at least one representative face image to identify one or more additional images representing the at least one named entity from images not included in the set.

2. The method of claim 1, further comprising receiving a search query from a user including the at least one named entity.

3. The method of claim 2, further comprising generating search results based on the search query, wherein the search results include the one or more additional images.

4. The method of claim 1, wherein the at least one named entity is a person.

5. The method of claim 4, wherein identifying the at least one named entity comprises identifying the at least one named entity from a query log or a web document.

6. The method of claim 1, wherein retrieving images associated with the at least one named entity comprises executing an image search to identify all images associated with the at least one named entity.

7. The method of claim 1, further comprising performing face matching for the detected faces in the retrieved images by comparing each detected face to each other detected face to identify faces that match a particular face image associated with the at least one named entity.

8. The method of claim 7, further comprising determining the number of faces that match the particular face image.

9. The method of claim 8, further comprising comparing the determined number of faces that match the particular face image to a threshold value.

10. The method of claim 7, further comprising determining the detected face in the retrieved images that matches the highest number of other detected faces in the retrieved images.

11. The method of claim 10, further comprising generating a training set of face images, wherein the training set includes each of the detected faces that match the particular face image associated with the at least one named entity.

12. The method of claim 11, further comprising generating at least one face model from the training set of face images.

13. The method of claim 12, further comprising labeling the at least one face model with at least a portion of the name of the at least one named entity.

14. The method of claim 12, wherein using the at least one representative face image to identify one or more additional images comprises using the at least one face model to identify the one or more additional images.

15. The method of claim 14, wherein using the at least one face model to identify the one or more additional images comprises comparing the face model to a collection of images to identify the one or more additional images.

16. The method of claim 15, further comprising associating the one or more additional images with the at least one named entity.

17. A system, comprising:
   an image collection system that identifies at least one named entity;
   a server that retrieves a set of three or more images associated with the at least one named entity, each of the images in the set including an associated textual description that includes at least a portion of a name of the named entity;
   a face detection system that performs face detection on the retrieved images to detect faces in the retrieved images;

means for identifying at least one representative face image from the retrieved images including means for comparing each detected face to other detected faces, where identifying the representative face image includes identifying the representative face image as the image that contains the detected face that matches a greatest number of the other of the detected faces; and means for using the at least one representative face image to identify one or more additional images representing the at least one named entity from images not included in the set.

18. The system of claim 17, further comprising means for receiving a search query from a user including the at least one named entity.

19. The system of claim 18, further comprising means for generating search results based on the search query, wherein the search results include the one or more additional images.

20. The system of claim 17, wherein the at least one named entity is a person.

21. The system of claim 20, wherein the image collection system that identifies the at least one named entity comprises means for identifying the at least one named entity from a query log or a web document.

22. The system of claim 17, wherein the server comprises means for executing an image search to identify all images associated with the at least one named entity.

23. The system of claim 17, further comprising means for performing face matching for the detected faces in the retrieved images by comparing each detected face to each other detected face to identify faces that match a particular face image associated with the at least one named entity.

24. The system of claim 23, further comprising means for determining the number of faces that match the particular face image.

25. The system of claim 24, further comprising means for comparing the determined number of faces that match the particular face image to a threshold value.

26. The system of claim 23, further comprising means for determining the detected face in the retrieved images that matches the highest number of other detected faces in the retrieved images.

27. The system of claim 26, further comprising means for generating a training set of face images, wherein the training set includes each of the detected faces that match the particular face image associated with the at least one named entity.

28. The system of claim 27, further comprising means for generating at least one face model from the training set of face images.

29. The system of claim 28, further comprising means for labeling the at least one face model with at least a portion of the name of the at least one named entity.

30. The system of claim 28, wherein means for using the at least one representative face image to identify one or more additional images comprises means for using the at least one face model to identify the one or more additional images.

31. The system of claim 30, wherein means for using the at least one face model to identify the one or more additional images comprises means for comparing the face model to a collection of images to identify the one or more additional images.

32. The system of claim 31, further comprising means for associating the one or more additional images with the at least one named entity.

33. A computer program product comprising instructions that when executed by one or more processors cause the processors to:

identify at least one named entity;

retrieve a set of three or more images associated with the at least one named entity, each of the images in the set including an associated textual description that includes at least a portion of a name of the named entity;

perform face detection on the retrieved images to detect faces in the retrieved images, wherein the face detection is performed using a face detection algorithm;

identify at least one representative face image from the retrieved images including comparing each detected face to other detected faces, where identifying the representative face image includes identifying the representative face image as the image that contains the detected face that matches a greatest number of the other of the detected faces; and use the at least one representative face image to identify one or more additional images representing the at least one named entity from images not included in the set.

* * * * *

UNITED STATES PATENT AND TRADEMARK OFFICE
CERTIFICATE OF CORRECTION

| | | |
|---|---|---|
| PATENT NO. | : 8,085,995 B2 | Page 1 of 1 |
| APPLICATION NO. | : 11/566075 | |
| DATED | : December 27, 2011 | |
| INVENTOR(S) | : Yagnik | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this
Twenty-fourth Day of July, 2012

David J. Kappos
*Director of the United States Patent and Trademark Office*